United States Patent
Arthur et al.

(10) Patent No.: US 7,549,388 B1
(45) Date of Patent: Jun. 23, 2009

(54) BUMPER LOCATING SYSTEM

(76) Inventors: Robert E. Arthur, 737 E. Short St., Winchester, IN (US) 47394; Judy Hall, 737 E. Short St., Winchester, IN (US) 47394

( * ) Notice: Subject to any disclaimer, the term of this patent is extended or adjusted under 35 U.S.C. 154(b) by 15 days.

(21) Appl. No.: 11/758,553

(22) Filed: Jun. 5, 2007

(51) Int. Cl.
  *B60Q 1/32* (2006.01)
(52) U.S. Cl. .................. 116/28 R; 116/30; 362/505
(58) Field of Classification Search ............ 116/28 R, 116/28 A, 30, 35 R; 340/436; 362/505, 506, 362/540
  See application file for complete search history.

(56) References Cited

U.S. PATENT DOCUMENTS

| | | | | |
|---|---|---|---|---|
| 2,324,614 | A * | 7/1943 | Dalton | 116/28 R |
| 2,522,105 | A * | 9/1950 | Eisenman | 248/539 |
| 3,788,268 | A * | 1/1974 | Hiatt et al. | 116/28 R |
| 3,858,924 | A * | 1/1975 | Bores | 293/117 |
| 4,152,694 | A * | 5/1979 | Toles | 340/463 |
| 4,313,104 | A | 1/1982 | Phillips | |
| 4,755,791 | A | 7/1988 | Kuroda | |
| 5,442,242 | A * | 8/1995 | Yoshida | 307/10.1 |
| D391,966 | S | 3/1998 | Mischenko et al. | |
| 5,826,966 | A | 10/1998 | Schwing | |
| 6,239,701 | B1 * | 5/2001 | Vasquez et al. | 340/539.32 |
| 6,345,587 | B1 | 2/2002 | Toscano | |
| 6,837,607 | B2 * | 1/2005 | Wagner | 362/565 |
| 6,880,959 | B2 | 4/2005 | Houston | |
| 7,434,971 | B1 * | 10/2008 | Wang | 362/496 |

FOREIGN PATENT DOCUMENTS

| | | | |
|---|---|---|---|
| JP | 07291027 | A * | 11/1995 |
| JP | 10175480 | A * | 6/1998 |
| JP | 11348651 | A * | 12/1999 |

* cited by examiner

*Primary Examiner*—R. Alexander Smith

(57) ABSTRACT

A bumper locating system includes a tractor trailer has a front end has a bumper attached thereto. The bumper has a first end edge corresponds to a driver's side of the trailer and a second end edge corresponding to a passenger's side of the trailer. A housing is attached to the bumper. A telescopic post is mounted in the housing and is extendable upwardly from the housing. A driver mechanism is mechanically coupled to the post. A control actuates the driver mechanism in a first direction to extend the post to an extended position fully extended upwardly from the housing or in a second direction to retract the post to a fully retracted position positioned in the housing. The post is placed in the extended position to guide a driver of the trailer.

4 Claims, 3 Drawing Sheets

BUMPER LOCATING SYSTEM

BACKGROUND OF THE INVENTION

1. Field of the Invention

The present invention relates to bumper locating devices and more particularly pertains to a new bumper locating device for assisting a trailer tractor driver in locating the position of an unseen front bumper.

2. Description of the Prior Art

The use of bumper locating devices is known in the prior art. While these devices fulfill their respective, particular objectives and requirements, the need remains for a system that can be utilized during the parking or maneuvering of a tractor trailer, otherwise known as a semi-truck, to assist the driver of the trailer in knowing the location of the passenger side portion of the bumper to ensure that the bumper does not strike an object.

SUMMARY OF THE INVENTION

The present invention meets the needs presented above by generally comprising a tractor trailer has a front end has a bumper attached thereto. The bumper has a first end edge corresponds to a driver's side of the trailer and a second end edge corresponding to a passenger's side of the trailer. A housing is attached to the bumper. A telescopic post is mounted in the housing and is extendable upwardly from the housing. A driver mechanism is mechanically coupled to the post. A control actuates the driver mechanism in a first direction to extend the post to an extended position fully extended upwardly from the housing or in a second direction to retract the post to a fully retracted position positioned in the housing. The post is placed in the extended position to guide a driver of the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
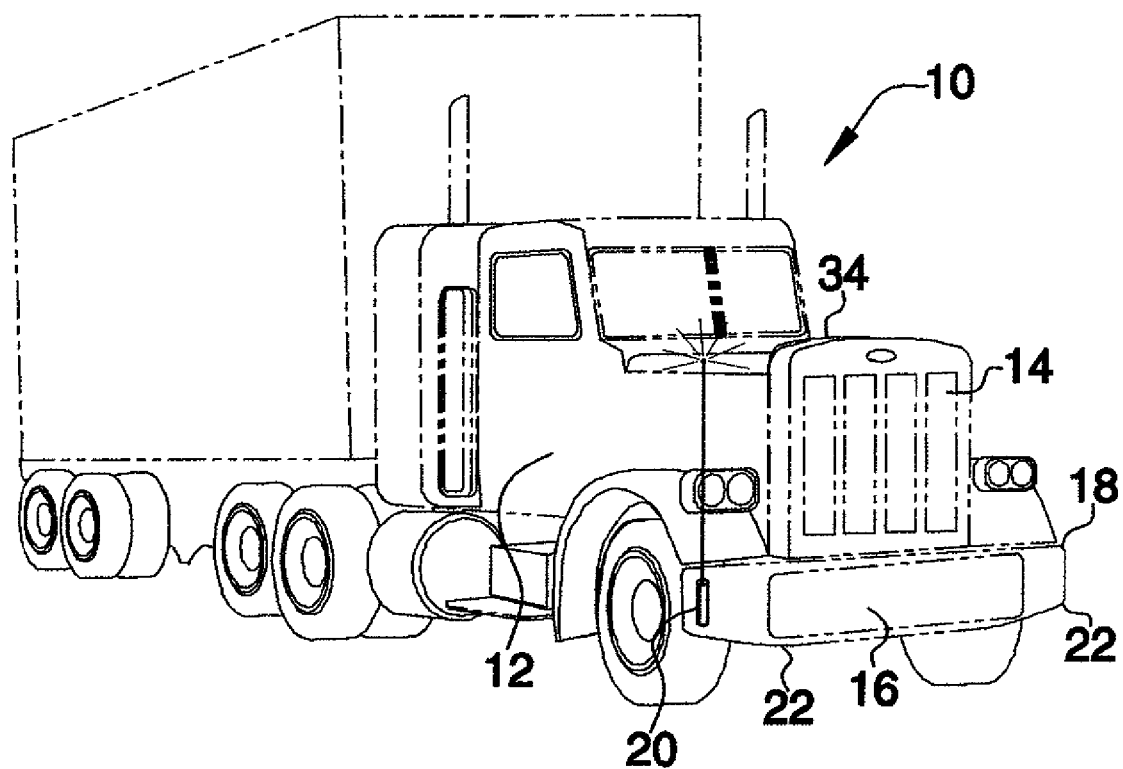
FIG. 1 is a perspective view of a bumper locating system according to the present invention.
Figures 2, 3:
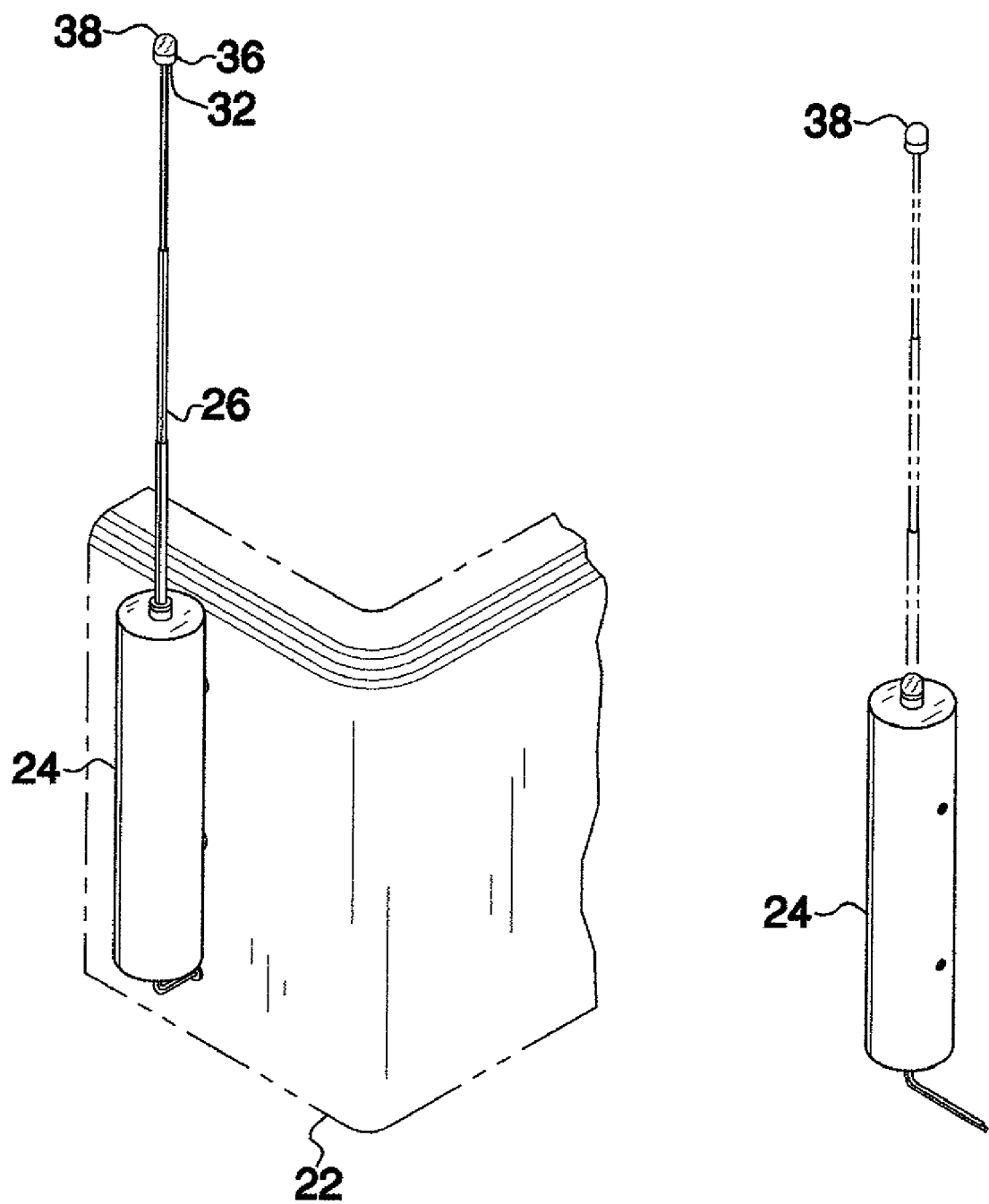
FIG. 2 is a front perspective view of a housing of the present invention.
FIG. 3 is a rear perspective view of the housing of the present invention.
Figure 4:
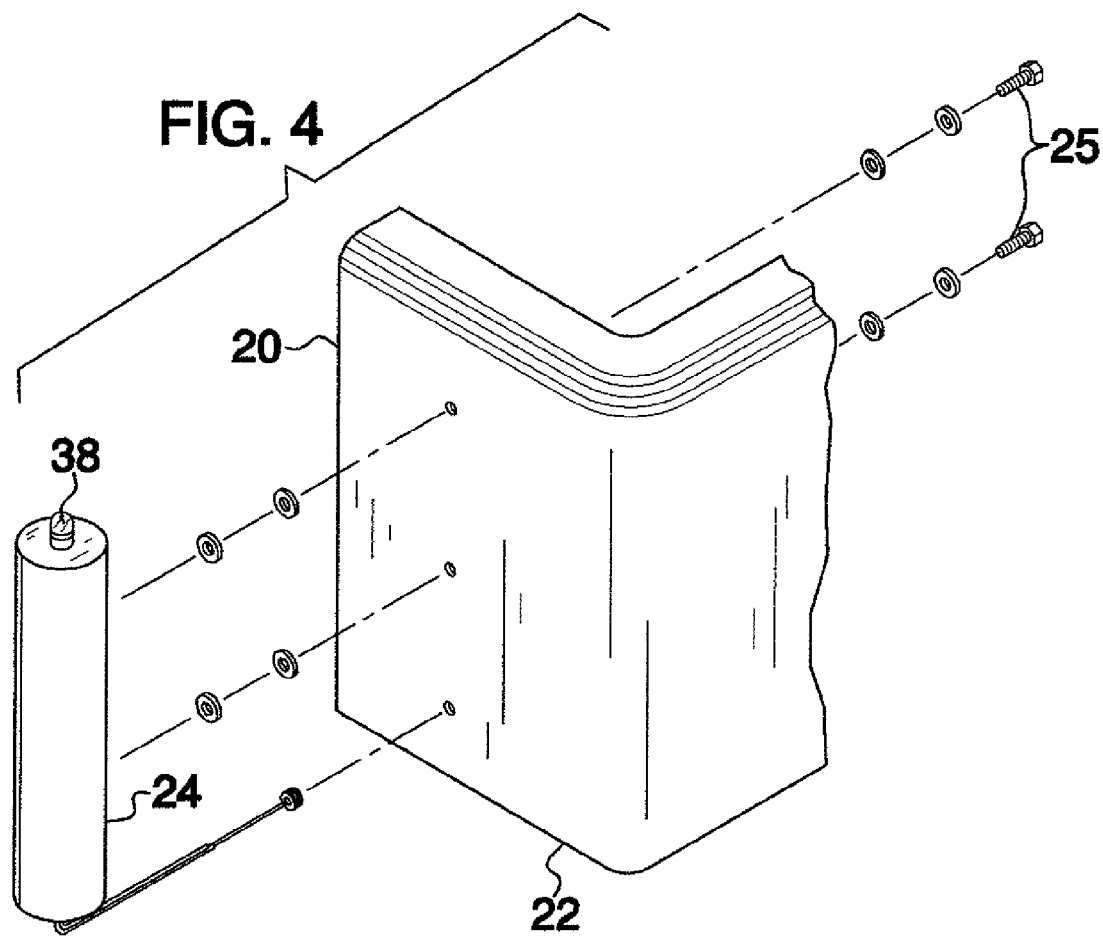
FIG. 4 is a perspective expanded view of the present invention.
Figure 5:
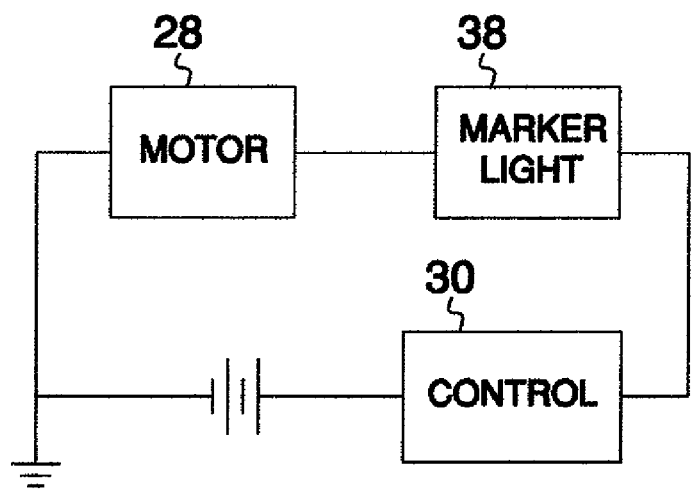
FIG. 5 is a schematic view of the present invention.

With reference now to the drawings, and in particular to FIGS. 1 through 5 thereof, a new bumper locating device embodying the principles and concepts of the present invention and generally designated by the reference numeral 10 will be described.

As best illustrated in FIGS. 1 through 5, the bumper locating system 10 generally comprises a tractor trailer 12 that has a front end 14 having a bumper 16 attached thereto. The bumper 16 has a first end edge 18 corresponding to a driver's side of the trailer 12 and a second end edge 20 corresponding to a passenger's side of the trailer 12. Between the first 18 and second 20 end edges are a pair of bends 22 in the bumper 16 to allow the bumper 16 to extend around side edges of the front end 14.

A housing 24 is attached to the bumper 16 with a plurality of fasteners 25. The housing 24 is positioned adjacent to the second end edge 20 of the bumper 16. A telescopic post 26 is mounted in the housing 24 and is extendable upwardly from the housing 24. A driver mechanism 28 is mechanically coupled to the post 26. A control 30 actuates the driver mechanism 28 in a first direction to extend the post 26 to an extended position fully extended upwardly from the housing 24 or in a second direction to retract the post 26 to a fully retracted position positioned within the housing 24. The post 26 and driver mechanism 28 is a conventional assembly such as is used with automatically retracting vehicle antennas. An upper end 32 of the post 26 extends above a hood 34 of the trailer 12 when the post 26 is in the extended position. A head 36 is attached to the upper end 32 of the post 26. The head 36 abuts the housing 24 when the post 26 is fully retracted.

A light emitter 38 is attached to the head 32. The light emitter 38 is electrically coupled to the control 30. The light emitter 38 emits light when the control 30 extends the post 26 to the extended position. A power supply of the driver mechanism 28 and light emitter 38 may include a battery mounted within the housing 24 or a power supply of the trailer 12. The control 30 may include a wireless control system including a receiver electrically coupled to the driver mechanism 28 and light emitter 38 and an actuating assembly that includes a transmitter for sending wireless signals to the receiver. Alternatively, the control 30 may be wired to the driver mechanism 28 and positioned within the trailer 12.

In use, a driver of the trailer 12 extends the post 26 when the driver is attempting to park the trailer 12. This provides the driver with a reference point to the front right portion of the bumper 16 of the trailer 12. The light emitter 38 allows the driver to see the top of the post 26 when it is dark. After the trailer 12 is parked, the post 26 is retracted back into the housing 24.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A bumper position indicator system comprising in combination:
   a tractor trailer having a front end having a bumper attached thereto, said bumper having a first end edge corresponding to a driver's side of said tractor trailer and a second end edge corresponding to a passenger's side of said tractor trailer;
   a housing being attached to said bumper;
   a telescopic post being mounted in said housing and being extendable upwardly from said housing, a driver mechanism being mechanically coupled to said post, a control actuating said driver mechanism in a first direction to extend said post to an extended position fully extended upwardly from said housing or in a second direction to retract said post to a fully retracted position positioned in said housing;
   wherein said post is placed in said extended position to guide a driver of the tractor trailer; and
   wherein said control includes a wireless control system having a receiver electrically coupled to said driver mechanism and an actuating assembly including a transmitter to send wireless signals to said receiver.

2. The system according to claim 1, wherein an upper end of said post extends above a hood of the tractor trailer when said post is in said extended position.

3. The system according to claim 1, further including:
   a head being attached to said upper end of said post, said head being positioned outside of said housing and abutting a top wall of said housing when said post is fully retracted; and
   a light emitter being attached to said head, said light emitter being electrically coupled to said control, said light emitter emitting light when said control extends said post to said extended position.

4. A bumper position indicator system comprising in combination:
   a tractor trailer having a front end having a bumper attached thereto, said bumper having a first end edge corresponding to a driver's side of said tractor trailer and a second end edge corresponding to a passenger's side of said tractor trailer;
   a housing being attached to said bumper, said housing being positioned adjacent to said second end edge of said bumper;
   a telescopic post being mounted in said housing and being extendable upwardly from said housing, a driver mechanism being mechanically coupled to said post, a control actuating said driver mechanism in a first direction to extend said post to an extended position fully extended upwardly from said housing or in a second direction to retract said post to a fully retracted position positioned in said housing, an upper end of said post extending above a hood of the tractor trailer when said post is in said extended position;
   a head being attached to said upper end of said post, said head being positioned outside of said housing and abutting a top wall of said housing when said post is fully retracted;
   a light emitter being attached to said head, said light emitter being electrically coupled to said control, said light emitter emitting light when said control extends said post to said extended position;
   wherein said post is placed in said extended position to guide a driver of the tractor trailer; and
   wherein said control includes a wireless control system having a receiver electrically coupled to said driver mechanism and an actuating assembly including a transmitter to send wireless signals to said receiver.

* * * * *